United States Patent [19]

Size et al.

[11] Patent Number: 5,297,840
[45] Date of Patent: Mar. 29, 1994

[54] LATCH FOR TRUCK SWING DOOR LOCK

[75] Inventors: Harrie A. Size, Akron, Ohio; Jack R. Wyatt, Marietta, Ga.

[73] Assignee: Waltco Truck Equipment Co., Tallmadge, Ohio

[21] Appl. No.: 7,136

[22] Filed: Jan. 21, 1993

[51] Int. Cl.⁵ .............................................. B62D 25/00
[52] U.S. Cl. ..................................... 296/50; 414/540; 292/300
[58] Field of Search ........................ 296/50, 51, 53; 414/540; 292/300

[56] References Cited

U.S. PATENT DOCUMENTS

| | | | |
|---|---|---|---|
| 2,635,771 | 4/1953 | Black | 414/540 |
| 3,240,369 | 3/1966 | Kappen | 414/540 |
| 3,502,367 | 3/1970 | Oliver | 296/50 |
| 4,918,866 | 4/1990 | Pastva | 296/50 X |

Primary Examiner—Robert R. Song
Attorney, Agent, or Firm—Donald D. Mon

[57] ABSTRACT

A latch plate for swing doors of a truck is disclosed which is movable between a latch engaging position and a retracted position. The latch plate in its retracted position would not interfere with vertically movable parts of a tailgate lift.

3 Claims, 2 Drawing Sheets

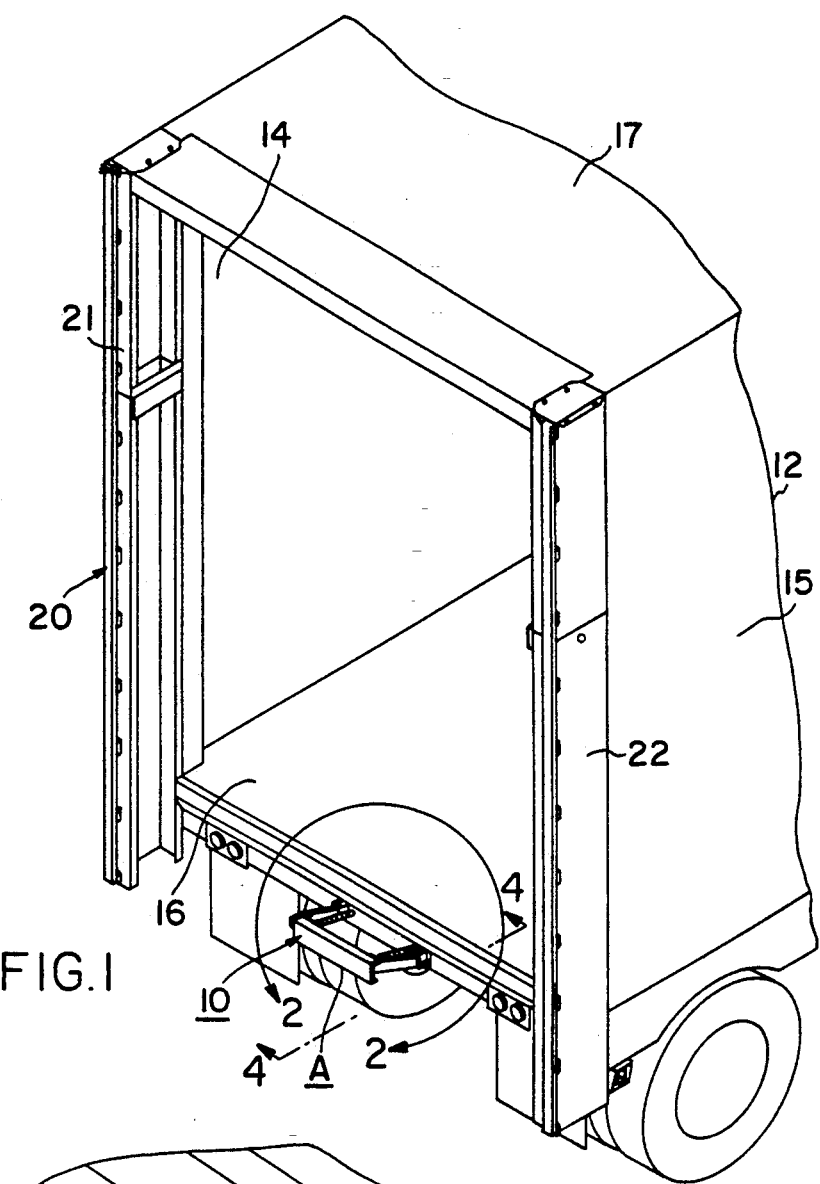
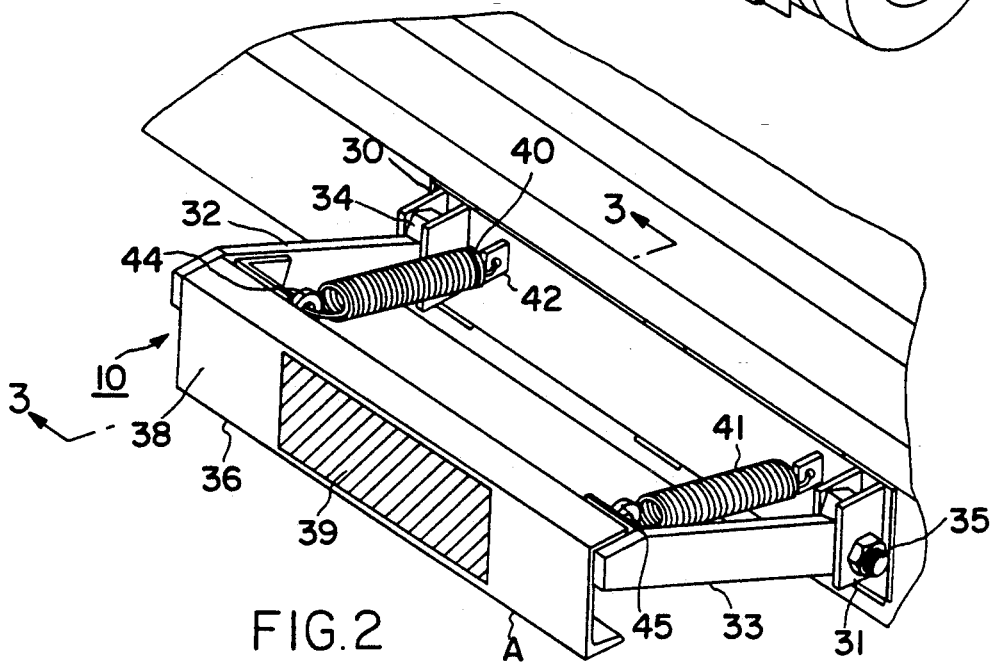

LATCH FOR TRUCK SWING DOOR LOCK

FIELD OF THE INVENTION

A latch for use with a swing door for a truck. The latch can be moved out of the path of associated equipment such as a tailgate lift.

BACKGROUND OF THE INVENTION

This invention relates to a latch for a swing door mounted to the rear of a truck body. Truck bodies are commonly provided with a pair of swing doors. Each of these doors is pivoted at a rear side corner of the body. They are pivoted together in a common plane to close the rear entry of the door, and are provided with locks to hold them closed. When unlocked they can be swung apart to give entry to the truck body.

Pivoted latches are well known for this purpose. They customarily include a vertical rotary shift with a latch tongue that fits into a latch pocket on the truck bed. The shafts are locked in an engaged position to keep the door secure when closed.

This is a common and useful closure which is encountered every day on the highways. However, it does have limitations. One of them is the inherent interference with some types of lift means which also are commonly provided at the rear of trucks. In particular, lift means which include vertical tracks at each side of the truck body have vertically movable components that move in the plane of conventional latch means of this type, and render this type of latch unsuitable for many applications.

It is an object of this invention to provide latch means for this type of closure which is compatible with it, and which does not interfere with vertically-movable parts of tailgate lifts.

It is another object of this invention to provide such latch means in a bi-stable configuration such that when not actively used for latching it can readily and reliably be pivoted out of the path of vertically-moving tailgate lift components.

It is another object of this invention to provide such latch means which can be used in vehicles of various widths.

BRIEF DESCRIPTION OF THE INVENTION

Latch means according to this invention is adapted to cooperate with lock means carried on a swing door. The latch means itself is mounted to the truck bed. It includes a latch plate and lever means mounting the latch plate to the truck bed. In its active, latching, position it is spaced by the lever means rearwardly of the truck bed sufficiently to receive the lock means, although in its active position it would interfere with the downward movement of the lift.

In its passive, unlatched, position, the latch plate and the lever means are swung downwardly and forwardly out of the path of the lift.

According to a preferred but optional feature of the invention, off-center bias spring means biases the lever means bi-stably toward whichever of the positions is selected, so as stably to hold the latch means in the selected position The above and other features of the invention will be fully understood from the following detailed description and the accompanying drawings, in which:

BRIEF DESCRIPTION OF THE DRAWINGS

FIG. 1 is a fragmentary perspective view of the rear end of a truck bed carrying latch means according to the invention;

FIG. 2 is an enlarged view of a portion of FIG. 1, taken at line 2—2 therein;

DETAILED DESCRIPTION OF THE INVENTION

Figure 5:
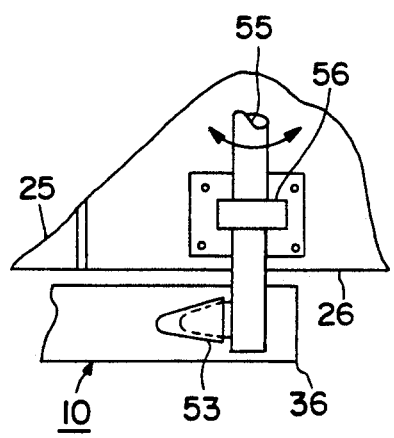
FIG. 5 is a fragmentary sideview of a modified portion of FIG. 1.

Latch means 10 according to this invention is intended for use with a truck body 12 having a rear entry 13 bounded by two vertical side panels 14, 15, a floor 16, and a roof 17. A tailgate lift 20, shown only schematically, includes vertical rails 21, 22 on each of the side panels. In operation its components 23 move in a vertical plane at the rear of the truck body. Rear doors 25, 26 (FIG. 5) are hinged to the rails, and when closed they shut the rear entry, and also enclose the tailgate lift. Locking the doors closed will secure the lift and also secure the contents of the truck.

The evident problem is to secure the doors by means which will not impede the operation of the lift, or which require substantial modification of either the truck bed or of the latch and lock means, or of the doors themselves. This invention accomplishes the objective with latch means 10, in which hinge plates 30, 31 are fixed to the truck bed, and a pair of levers 32, 33 are hinged to the plates by hinge pins 34, 35.

A latch plate 36 is conveniently formed as a channel member rigidly fixed to levers 32 and 33. Plate 36 has a face 38 to which any suitable latch hardware can be attached. The type of hardware is unimportant to this invention.

For purposes of illustration, an area 39 is shown, in which any desired latch hardware can be attached.

Two off-center bias springs 40, 41 are fixed to anchors 42, 43 on the truck bed, and to brackets 44, 45 on the latch plate. This is a classical bi-stable bias spring arrangement in which the pivot pins and the anchors are laterally spaced apart (see FIG. 3), such that there is a more tensioned spring condition between the less-tensioned spring conditions which occur when the latch plate is in either of its stable positions (the active and passive positions). Stated otherwise, it is necessary to overcome a resistive spring force in order to move the latch plate from either position to the other.

Figure 3:
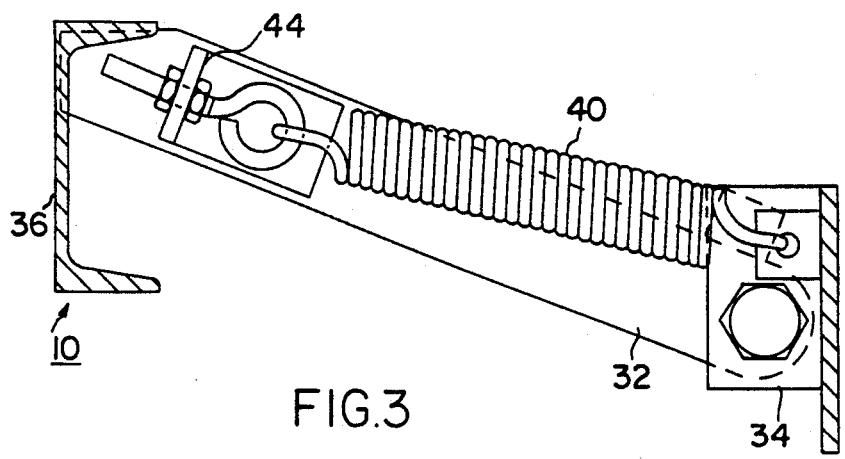
FIG. 3 is a cross-section taken at line 3—3 in FIG. 2.
Figure 4:
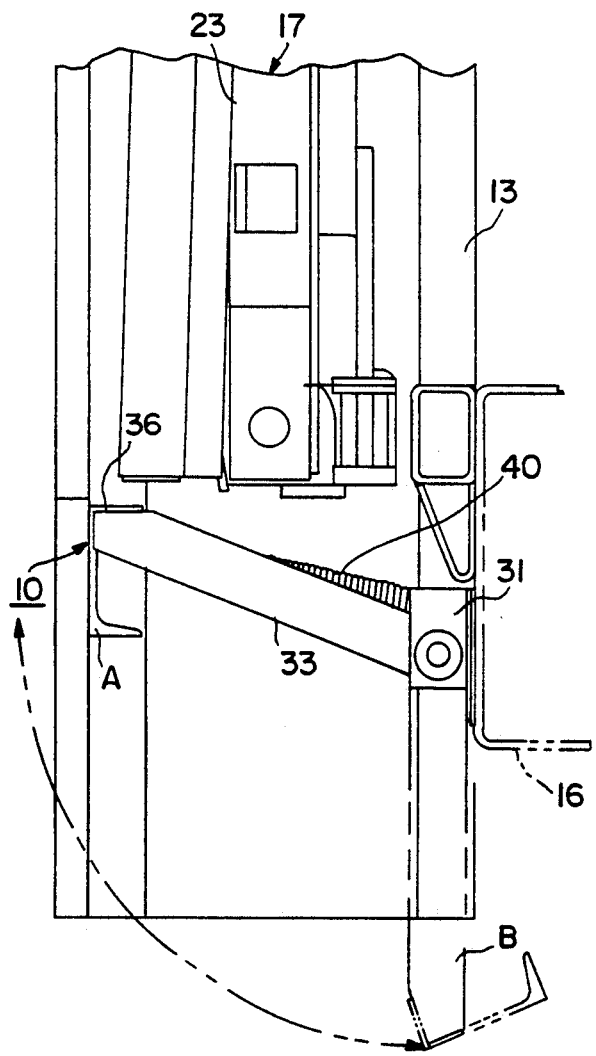
FIG. 4 is a fragmentary section taken at line 414 4 in FIG. 1.

The active latch position is shown by "A" in FIGS. 1-3 The inactive stowed position is shown by "B" in FIG. 4.

As an example of useful hardware, two latch pockets of which only pocket 51 is shown are welded to face 38. When closed, they can receive a tongue 53 on a respective latch shaft 55 pivotally mounted on the doors, which shafts can be locked in place to hold them in their locked position. One of these is provided on latch door, one for each pocket. Each has a bearing 56 to mount the shaft for rotation. This is a common door lock arrangement, but is only one example of latch means which can be used to secure the doors. Generally a handle is fixed to each shaft, which can be locked to the door.

As can be seen in FIG. 4, lift hardware 23 is adapted to move in the vertical plane. In the latched position shown in solid line in FIG. 4, the doors are closed and locked, and the latch means impedes the hardware. This is tolerable and expected. To use the hardware, the latch means is pivoted to position B where the hardware is not impeded. The latch plate means is stable in either position. Any suitable latch means can be applied to the latch plate.

This invention is not to be limited by the embodiments shown in the drawings and described in the description, which are given by way of example and not of limitation, but only in accordance with the scope of the appended claims.

I claim:

1. In combination with a truck body having a rear entry, a floor, two side panels and a roof, a tailgate lift mechanism mounted to said truck body at said rear end having a pair of vertical rails along which a portion of the lift moves in shear relationship to the rear entry and its floor, and closure means hinged at said rear entry to close said rear entry and enclose said tailgate lift mechanism, said closure means including lock means, the improvement comprising:

latch plate means carrying latch means complementary to said lock means, lever means fixed to said latch plate means and hinged to said truck body, said hinge means having a hinge axis; said latch plate means being enabled by said lever means to move to an active latch position where it is engageable by said lock means, said lever means then being in the path of said lift, and an inactive stowed position beneath said floor and forwardly of said lift means wherein said lock means are disengaged from said latch means, said closure means are released so as to be opened, and said latch plate means is not in the path of said lift mechanism.

2. A combination according to claim 1 in which off-center spring bias means is anchored to said body and to said latch plate means; said spring means being anchored to said body laterally from said hinge means such that when it is moved from between said active latch position and in said inactive stowed position, said spring means must undergo an increased tension.

3. A combination according to claim 2 in which said latch means comprises a pair of pockets on said latch plate means, and said lock means comprises a pair of shafts, one of which is rotatably mounted to each said door, each said shaft including a tongue insertable into a respective pocket when said latch plate means is in its active position.

* * * * *